(12) United States Patent
Ersoy et al.

(10) Patent No.: US 6,857,810 B2
(45) Date of Patent: Feb. 22, 2005

(54) CERAMIC BALL-AND-SOCKET JOINT

(75) Inventors: Metin Ersoy, Walluf (DE); Martin Rechtien, Neuenkirchen-Vörden (DE)

(73) Assignee: ZF Lemförder Metallwaren AG, Stemwede-Dielingen (DE)

( * ) Notice: Subject to any disclaimer, the term of this patent is extended or adjusted under 35 U.S.C. 154(b) by 0 days.

(21) Appl. No.: 10/450,937

(22) PCT Filed: Oct. 8, 2002

(86) PCT No.: PCT/DE02/03778

§ 371 (c)(1),
(2), (4) Date: Jun. 17, 2003

(87) PCT Pub. No.: WO03/033922

PCT Pub. Date: Apr. 24, 2003

(65) Prior Publication Data

US 2004/0037622 A1 Feb. 26, 2004

(30) Foreign Application Priority Data

Oct. 11, 2001 (DE) .......................... 101 49 995

(51) Int. Cl.[7] .............................. F16C 11/00
(52) U.S. Cl. ...................... 403/131; 403/128; 403/130; 403/141; 403/142; 403/143; 280/93.511
(58) Field of Search .................. 280/93.51, 93.511; 403/76, 122, 128, 135, 130–132, 140–143

(56) References Cited

U.S. PATENT DOCUMENTS

| | | | |
|---|---|---|---|
| 2,912,267 A | | 11/1959 | Latzen |
| 3,329,453 A | | 7/1967 | Patton |
| 3,685,878 A | * | 8/1972 | Orkin .......................... 384/213 |
| 3,916,451 A | * | 11/1975 | Buechel et al. ............ 623/23.4 |
| 4,033,019 A | | 7/1977 | Orkin |
| 4,619,658 A | * | 10/1986 | Pappas et al. ........... 623/22.19 |
| 4,624,674 A | | 11/1986 | Pappas et al. |
| 5,062,853 A | * | 11/1991 | Forte .......................... 623/22.2 |
| 5,860,757 A | * | 1/1999 | Sugiura ...................... 403/131 |
| 6,113,303 A | * | 9/2000 | Buhl et al. .................. 403/282 |

FOREIGN PATENT DOCUMENTS

| | | |
|---|---|---|
| DE | 40 35 614 | 5/1992 |
| DE | 42 26 986 | 2/1994 |
| DE | 199 26 923 | 12/2000 |
| EP | 0 279 275 | 8/1988 |
| EP | 0 667 464 | 8/1995 |
| GB | 1 259 672 | 1/1972 |

* cited by examiner

*Primary Examiner*—Daniel P. Stodola
*Assistant Examiner*—Michael P. Ferguson
(74) *Attorney, Agent, or Firm*—McGlew and Tuttle, P.C.

(57) ABSTRACT

A ceramic ball-and-socket joint for a motor vehicle, especially for the chassis of the motor vehicle, is provided, in which the ball-and-socket joint has a ball-and-socket joint housing (5) provided with a joint opening (7) and a ball pivot provided with a joint ball (1) and with a pivot (13), which said ball pivot is mounted rotatably and pivotably with its joint ball (1) in a bearing shell (2) arranged in the ball-and-socket joint housing (5), wherein the ball pivot protrudes with its pivot (13) from the ball-and-socket joint housing (5) through the joint opening (7). The bearing shell (2) is divided into at least two separate bearing shell parts (3, 4), wherein the joint ball (1) and the bearing shell (13) are made of a ceramic material.

26 Claims, 1 Drawing Sheet

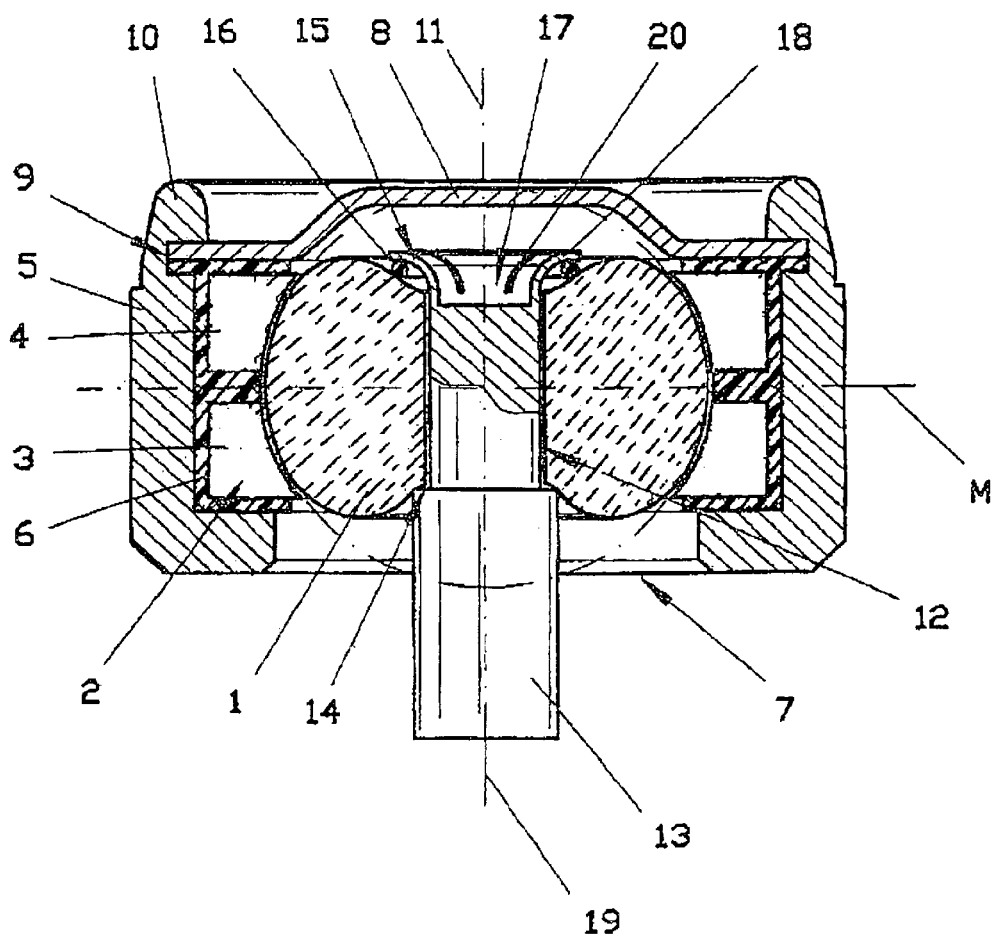

CERAMIC BALL-AND-SOCKET JOINT

The present invention pertains to a ball-and-socket joint for a motor vehicle, especially for the chassis of the motor vehicle, with a ball-and-socket joint housing provided with a joint opening, with a ball pivot, which has a joint ball and a pivot, and which is mounted rotatably and pivotably with its joint ball in a bearing shell arranged in the ball-and-socket joint housing and protrudes with its pivot out of the ball-and-socket joint housing through the joint opening.

Such a ball-and-socket joint has been known from EP 0 667 464 B1, where the ball pivot is designed as a two-part component. A through opening, through which the pivot of the ball pivot extends, is provided in the joint ball made of metal. The pivot is held by a deformation of a beaded edge of the pivot, which is located within the through opening of the joint ball.

The ball-and-socket joint is highly sensitive to dirt particles that become incorporated in both the bearing shell and the joint ball once they have entered the interior of the ball-and-socket joint and thus may destroy these on their surfaces. Furthermore, the joint ball is sensitive to rusting, so that shielding against moisture must also be provided besides shielding of the interior of the ball-and-socket joint against dirt.

This is usually done in conventional ball-and-socket joints by the interior of the ball-and-socket joint being filled with a lubricant and by the opening of the ball-and-socket joint being protected by means of a sealing bellows against the entry of dirt and moisture.

However, not only do the lubricant and the sealing bellows cause additional costs, but they also lead to an increased manufacturing effort. Furthermore, the ball pivot needs to be longer than would be necessary for purely design reasons without a sealing bellows when a sealing bellows is used in order to achieve a good sealing action.

Bearing shells known from the state of the art are frequently made from POM, because POM has a low coefficient of friction. However, the use of POM limits the maximum continuous use temperature of the ball-and-socket joint to about 100° C., so that such ball-and-socket joints must not be arranged, e.g., in the immediate vicinity of motor vehicle brakes. POM also has a low maximum possible surface pressure, so that large ball diameters are selected for the joint ball to reduce the surface pressure acting on the bearing shell.

The basic object of the present invention is to provide a ball-and-socket joint of the type mentioned in the introduction, which can be manufactured at a lower cost at equal mechanical requirements and whose dimensions can be reduced and has a markedly longer service life.

This object is accomplished according to the present invention by a ball-and-socket joint with the features according to patent claim 1. Preferred variants are claimed in the subclaims.

The ball-and-socket joint according to the present invention for a motor vehicle, especially for the chassis of the motor vehicle, has a ball-and-socket joint housing provided with a joint opening and a ball pivot, which has a joint ball and a pivot and which is mounted rotatably and pivotably with its joint ball in a bearing shell arranged in the ball-and-socket joint housing, wherein the ball pivot with its pivot protrudes from the ball-and-socket joint housing through the joint opening. The bearing shell is divided into at least two bearing shell parts, wherein the joint ball and the bearing shell are made of a ceramic material.

The ceramic used is corrosion resistant to water and very hard, so that dirt particles are pulverized between the joint ball and the bearing shell and are rendered ineffective for wear. Thus, the use of a scaling bellows as a protection against contaminants and water can be eliminated in the ball-and-socket joint according to the present invention. However, if the sealing bellows is eliminated, the clamping rings usually used to fasten the scaling bellows can be eliminated as well. The surface of the ceramic used may also have a very low coefficient of friction, so that no lubricant is needed. Besides these possible savings in terms of material, the process steps linked with these materials during the manufacture of the ball-and-socket joint may also be eliminated. Furthermore, the maximum possible surface pressure is considerably higher in the case of a ceramic material than in the case of, e.g., POM, so that smaller ball radii can be selected for the joint ball. The surface of the ceramic material is not subject to wear or is subject to very little wear only, so that the ball-and-socket joint according (o the present invention has a markedly longer service life.

However, the ball-and-socket joint according to the present invention can thus also be made at a lower cost and smaller than a ball-and-socket joint known from the state of the art that is intended for the same use. Furthermore, ceramic is also more insensitive to temperature than POM, which expands the range of use of the ball-and-socket joint according to the present invention.

The bearing shell may be directly in contact with the ball-and-socket joint housing. However, an intermediate layer made of an elastic material is preferably arranged between the bearing shell and the ball-and-socket joint housing, so that shocks can be transmitted from (the bearing shell to the ball-and-socket joint housing or vice versa in a damped manner only. This has a favorable effect on the life of the generally brittle ceramic material and improves the comfort during driving.

The two separate bearing shell parts may be arranged at spaced locations from one another, and the area between the edges of the two bearing shell parts facing each other is free. However, the intermediate layer preferably extends up into the area between the edges of the two bearing shell parts facing each other, so that these form a uniform bearing body for the joint ball together with the intermediate layer. If the intermediate layer does not extend up to the joint ball, the cavity formed between the intermediate layer and the joint ball may be used to hold dust that is formed, e.g., due to the pulverization of dirt particles.

On its side facing away from the joint opening, the ball-and-socket joint housing may be closed with a cover, whose edge engages a recess or groove provided in the inner wall of the ball-and-socket joint housing. The intermediate layer now preferably extends up into the recesses and is (bus arranged between the cover and the ball-and-socket joint housing.

The intermediate layer may be manufactured from an elastic material such as rubber. However, the intermediate layer is preferably manufactured from a plastic, because plastics can be regularly designed for a higher temperature resistance and may possess markedly better sliding properties. Furthermore, plastic can often be injection-molded more simply than rubber. The use of injection-moldable materials such as rubber or plastic makes possible the injection molding around the two bearing shell parts to form a common bearing body, which can be held together by the injection-moldable material without clearance. Furthermore, fibers may be embedded in the injection-moldable material in order to increase its load-bearing capacity. The suitable fibers include, e.g., glass, carbon or aramide fibers.

The intermediate layer is, furthermore, a mounting aid, because the joint ball and the two bearing shells can be sprayed around with plastic or rubber in a mold to form a composite, and this composite will then have a small clearance between the joint ball and the bearing shell and can be mounted in the ball-and-socket joint housing in a simple manner.

According to a first variant, the two bearing shell parts may be separated from one another with respect to a plane, in which the longitudinal axis of the bearing is located (vertical division). However, a second variant is preferred, according to which a first of the two bearing shell parts is arranged in the area of the ball-and-socket joint housing facing the joint opening with respect to the meridian plane defined by the great circle extending at right angles to the longitudinal axis of the bearing on the joint ball, and the second ball-and-socket joint part is arranged in the area of the ball-and-socket joint housing facing away from the joint opening with respect to the meridian plane. The meridian plane thus forms a division plane between the two bearing shell parts, so that these are located opposite each other with respect to the meridian plane (horizontal division).

The pivot may likewise be manufactured from a ceramic material. However, the pivot is preferably manufactured from a metallic material and is connected to the joint ball in substance or in a positive-locking manner. It is achieved as a result that the pivot can absorb stronger tensile forces.

The positive-locking connection between the pivot and the joint ball is preferably achieved by a through opening, through which the pivot extends, being provided in the joint ball. A shoulder, which is in contact with the edge of the through opening facing the joint opening, is formed on the pivot, and the pivot is widened up at its end arranged in the joint housing such that the joint ball is fixed to the pivot between the shoulder and the widened end of the pivot in a positive-locking manner.

The widened end of the pivot may be directly in contact with the joint ball. However, a ring made of metal or an elastic material is preferably inserted between the widened end of the pivot and the joint ball, which makes it possible to distribute the forces applied by the widened end on the joint ball over a larger area. For example, steel may be used as the metal and, e.g., rubber may be used as the elastic material.

The ceramic material may be made, e.g., on the basis of aluminum oxide, silicon nitride or zirconium oxide. However, the use of so-called "hard metals," e.g., tungsten carbide or titanium carbide, is possible as well. The list of these materials shall not be considered to be limiting, so that other ceramic materials or mixed ceramic materials, which meet the requirements imposed in the motor vehicle, especially in the chassis of the motor vehicle, may be used as well.

The surface of the joint ball may be made smooth. However, the surface of the joint ball may also be provided with a profile, so that contaminants can be better removed from the ball-and-socket joint. One possible type of profiling is, e.g., the formation of circular depressions in the surface of the joint ball, similarly to those in a golf ball.

The present invention will be described on the basis of a preferred embodiment with reference to the drawings. In the drawings, FIG. 1 shows a sectional view of an embodiment of the ball-and-socket joint according to the present invention.

The figure shows an embodiment of the ball-and-socket joint according to the present invention, where a joint ball 1 made of ceramic is mounted rotatably or pivotably in a bearing shell 2 likewise made of ceramic. The bearing shell 2 is divided into two separate bearing shell parts 3 and 4 and is arranged in a ball-and-socket joint housing 5. An intermediate layer 6 made of plastic, which also extends into the area between the edges of the two bearing shell parts 3 and 4 facing each other, is provided between the bearing shell 2 and the ball-and-socket joint housing 5. The ball-and-socket joint housing 5 is a cylindrical body, one front surface of which forms a joint opening 7 and whose other front surface is closed with a cover 8. The cover 8 engages for this an annular groove 9, which is formed in the inner wall of the ball-and-socket joint housing 5 and is formed by flanging the edge 10 of the ball-and-socket joint housing 5 surrounding the cover 8 in the direction of the longitudinal axis 11 of the bearing. The intermediate layer 7 also engages the annular groove 9 and is fixed there between the cover 8 and the ball-and-socket joint housing 5. Even though the cover 8 is closed according to this embodiment, a ring-shaped cover, which leaves the ball-and-socket joint housing open, is also possible.

A through hole 12, through which a pivot 13 made of metal extends, is provided in the joint ball 1. A ring shoulder 14, which is in contact with the edge of the through hole 12 facing the joint opening 7, is formed on the pivot 13. On the other side of the through hole 12, the pivot is provided with a widening 15, which is pressed via a rubber ring 16 against the edge of the through hole 12 facing away from the joint opening 7. The joint ball 1 is thus fixed at the pivot 13 in a positive-locking manner. To form the widening 15, a cylindrical recess 17, which is surrounded by an edge 18 in a ring-shaped pattern and is concentric to the longitudinal axis 19 of the pivot 13, is provided in the end area of the ball pivot 13 arranged in the ball-and-socket joint housing 5. The edge 18 is flanged radially toward the outside, i.e., in the direction away from the longitudinal axis 19 of the pivot 13, which longitudinal axis 1 of the ball-and-socket joint in the non-deflected state of d-socket joint housing 5. Furthermore, slots 20 are provided in the edge 18, re easily.

LIST OF REFERENCE NUMBERS

1 Joint ball
2 Bearing shell
3 First bearing shell part
4 Second bearing shell part
5 Ball-and-socket joint housing
6 Intermediate layer
7 Joint opening
8 Cover
9 Annular groove
10 Edge
Bearing longitudinal axis
12 Through opening
13 Pivot
14 Ring shoulder
15 Widening of the pivot end arranged in the housing
16 Rubber ring
17 Recess
18 Edge of recess
19 Longitudinal axis of pivot
20 Slots
M Meridian plane.

What is claimed is:

1. A ball-and-socket-joint for a motor vehicle or for a chassis of the motor vehicle, the ball-and-socket joint comprising:

a ball-and-socket joint housing provided with a joint opening;

a bearing shell;

a ball pivot with a joint ball and a pivot, said joint ball being mounted rotatably and pivotably in said bearing shell arranged in said ball-and-socket joint housing, said pivot protruding from said ball-and-socket joint housing through said joint opening and said bearing shell being divided into at least two separate bearing shell parts, said joint ball comprising a ceramic material and said bearing shell comprising a ceramic material, wherein a first of said two bearing shell parts is arranged in the area of said ball-and-socket joint housing facing said joint opening with respect to a meridian plane defined by a great circle extending at right angles to a longitudinal axis of the bearing shell on said joint ball, and said second bearing shell part is arranged in an area of said ball-and-socket joint housing facing away from said joint opening with respect to said meridian plane.

2. A ball-and-socket joint in accordance with claim 1, wherein an intermediate layer of an elastic material is arranged between said bearing shell and said ball-and-socket joint housing.

3. A ball-and-socket joint in accordance with claim 2, wherein said ball-and-socket joint housing is closed with a cover having an edge engaging a recess provided in an inner wall of said ball-and-socket joint housing, said intermediate layer extending up into said recess and being arranged between said cover and said ball-and-socket joint housing.

4. A ball-and-socket joint in accordance with claim 2, wherein said intermediate layer is made of plastic.

5. A ball-and-socket joint in accordance with claim 1, wherein said two bearing shell parts are separated from one another with respect to a plane in which a longitudinal axis of the bearing shell is located.

6. A ball-and-socket joint in accordance with claim 1, wherein said pivot is made of a metallic material and is connected to said joint ball in a positive-locking manner.

7. A ball-and-socket joint in accordance with claim 6, wherein a through hole is provided in said joint ball, said pivot extending through said through hole; and a shoulder in contact with the edge of said through hole facing said joint opening, is formed on said pivot; and said pivot is widened at its end arranged in said ball-and-socket joint housing such that said joint ball is fixed to said pivot between said shoulder and said widened end of said pivot.

8. A ball-and-socket joint in accordance with claim 1, wherein the ceramic material of said joint ball and said bearing shell is made of aluminum oxide, silicon nitride, zirconium oxide, tungsten carbide or titanium carbide.

9. A ball-and-socket joint in accordance with claim 1, wherein said meridian plane forms a division plane between the two bearing shell parts.

10. A ball-and-socket joint in accordance with claim 9, wherein both bearing shell parts are made of the ceramic material.

11. A ball-and-socket joint in accordance with claim 10, wherein a gap is provided between the bearing shell parts.

12. A ball-and-socket joint for a motor vehicle or for a chassis of the motor vehicle, the ball-and-socket joint comprising:
a ball-and-socket joint housing provided with a joint opening;
a bearing shell;
a ball pivot with a joint ball and a pivot, said joint ball being mounted rotatably and pivotably in said bearing shell arranged in said ball-and-socket joint housing, said pivot protruding from said ball-and-socket joint housing through said joint opening and said bearing shell being divided into at least two separate bearing shell parts, said joint ball comprising a ceramic material and said bearing shell comprising a ceramic material, wherein an intermediate layer of an elastic material is arranged between said bearing shell and said ball-and-socket joint housing, said intermediate layer extends up into an area between edges of said two bearing shell parts facing each other.

13. A ball-and-socket joint for a motor vehicle or for a chassis of the motor vehicle, the ball-and-socket comprising:
a ball-and-socket joint housing provided with a joint opening;
a bearing shell;
a ball pivot with a joint ball and a pivot, said joint ball being mounted rotatably and pivotably in said bearing shell arranged in said ball-and-socket joint housing, said pivot protruding from said ball-and-socket joint housing through said joint opening said bearing shell being divided into at least two separate bearing shell parts, said joint ball comprising a ceramic material and said bearing shell comprising a ceramic material wherein said pivot is made of a metallic material and is connected to said joint ball in a positive-locking manner, wherein: a through hole is provided in said joint ball, said pivot extending through said through hole; and a shoulder in contact with the edge of said through hole facing said joint opening, is formed on said pivot; and said pivot is widened at its end arranged in said ball-and-socket joint housing such that said joint ball is fixed to said pivot between said shoulder and said widened end of said pivot, wherein a ring made of an elastic material is inserted between said widened end of the pivot and said joint ball.

14. A ball-and-socket joint comprising:
a ball-and-socket joint housing with a joint opening;
a bearing shell being divided into at least two separate bearing shell parts, each of said two separate bearing shell pans comprising a ceramic material; and
a ball pivot with a joint ball and a pivot, said joint ball being mounted rotatably and pivotably in said bearing shell arranged in said ball-and-socket joint housing, said pivot protruding from said ball-and-socket joint housing through said joint openings said joint ball comprising a ceramic materials a through hole being provided in said joint ball, said pivot extending through said through hole, said pivot having a shoulder in contact with an edge of said through hole facing said joint opening, and said pivot being widened at an end arranged in said ball-and-socket joint housing such that said joint ball is fixed to said pivot between said shoulder and said widened end of said pivot.

15. A ball-and-socket joint in accordance with claim 14, wherein an intermediate layer of an elastic material is arranged between said bearing shell and said ball-and-socket joint housing.

16. A ball-and-socket joint in accordance with claim 15, wherein said ball-and-socket joint housing is closed with a cover having an edge engaging a recess provided in an inner wall of said ball-and-socket joint housing, said intermediate layer extending up into said recess and being arranged between said cover and said ball-and-socket joint housing.

17. A ball-and-socket joint in accordance with claim 15, wherein said intermediate layer is made of plastic and said pivot is made of a metallic material and is connected to said joint ball in a positive-locking manner.

18. A ball-and-socket joint in accordance with claim 14, wherein said two bearing shell parts are separated from one another with respect to a plane in which a longitudinal axis of the bearing shell is located.

19. A ball-and-socket joint in accordance with claim 14, wherein a first of said two bearing shell parts is arranged in the area of said ball-and-socket joint housing facing said joint opening with respect to a meridian plane defined by a great circle extending at right angles to a longitudinal axis of the bearing shell on said joint ball, and said second bearing shell part is arranged in an area of said ball-and-socket joint housing facing away from said joint opening with respect to said meridian plane.

20. A ball-and-socket joint in accordance with claim 19, wherein the meridian plane forms a division plane between the two bearing shell parts.

21. A ball-and-socket joint in accordance with claim 20, wherein a gap is provided between the bearing shell parts.

22. A ball-and-socket joint in accordance with claim 14, wherein the ceramic material of said joint ball and said bearing shell is made of aluminum oxide, silicon nitride, zirconium oxide, tungsten carbide or titanium carbide.

23. A ball-and-socket joint in accordance with claim 14, wherein the pivot extends through the joint ball.

24. A ball-and-socket joint in accordance with claim 14, wherein said pivot is made of metallic material and is connected to said joint ball in a positive-locking manner.

25. A ball-and-socket joint comprising:
a ball-and-socket joint housing with a joint opening;
a bearing shell being divided into at least two separate bearing shell parts, each of said two separate bearing shell parts comprising a ceramic material; and
a ball pivot with a joint ball and a pivot, said joint ball being mounted rotatable and pivotably in said bearing shell arranged in said ball-and-socket joint housing, said pivot protruding from said ball-and-socket joint housing through said joint opening, said joint ball comprising ceramic material wherein an intermediate layer of an elastic material is arranged between said bearing shell and said ball-and-socket joint housing, wherein said intermediate layer extends up into an area between edges of said two bearing shell parts facing each other.

26. A ball-and-socket joint in accordance with claim 25, wherein said ball-and-socket joint housing is closed with a cover having an edge engaging a recess provided in an inner wall of said ball-and-socket joint housing, said intermediate layer extending up into said recess and being arranged between said cover and said ball-and-socket joint housing.

* * * * *